(12) United States Patent
Fu et al.

(10) Patent No.: US 10,405,004 B2
(45) Date of Patent: Sep. 3, 2019

(54) APPARATUS AND METHOD OF SAMPLE ADAPTIVE OFFSET FOR LUMA AND CHROMA COMPONENTS

(71) Applicant: HFI Innovation Inc., Zhubei, Hsinchu County (TW)

(72) Inventors: Chih-Ming Fu, Hsinchu (TW);
Ching-Yeh Chen, Taipei (TW);
Chia-Yang Tsai, New Taipei (TW);
Yu-Wen Huang, Taipei (TW);
Shaw-Min Lei, Zhubei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 699 days.

(21) Appl. No.: 15/015,537

(22) Filed: Feb. 4, 2016

(65) Prior Publication Data
US 2016/0156938 A1     Jun. 2, 2016

Related U.S. Application Data

(62) Division of application No. 13/311,953, filed on Dec. 6, 2011, now abandoned.
(Continued)

(51) Int. Cl.
*H04N 19/82*     (2014.01)
*H04N 19/157*    (2014.01)
(Continued)

(52) U.S. Cl.
CPC ........... *H04N 19/82* (2014.11); *H04N 19/117* (2014.11); *H04N 19/132* (2014.11);
(Continued)

(58) Field of Classification Search
CPC .... H04N 19/82; H04N 19/117; H04N 19/132; H04N 19/157; H04N 19/176;
(Continued)

(56) References Cited

U.S. PATENT DOCUMENTS

2002/0136294 A1*  9/2002  Culbert ................. H04N 19/61
                                                                 375/240.02
2004/0008899 A1    1/2004  Tourapis et al.
(Continued)

FOREIGN PATENT DOCUMENTS

CN        101517909        8/2009
CN        101517909 A      8/2009
(Continued)

OTHER PUBLICATIONS

McCann et al., "Samsung's Response to the Call for Proposals on Video Compression Technology", Apr. 2010, JCTVC-A124, pp. 10, 19, 24, 32 and 36. (Year: 2010).*
(Continued)

*Primary Examiner* — Matthew K Kwan
(74) *Attorney, Agent, or Firm* — McClure, Qualey & Rodack, LLP

(57) ABSTRACT

A method and apparatus for processing reconstructed video using in-loop filter in a video coding system are disclosed. The method uses chroma in-loop filter indication to indicate whether chroma components are processed by in-loop filter when the luma in-loop filter indication indicates that in-loop filter processing is applied to the luma component. An additional flag may be used to indicate whether the in-loop filter processing is applied to an entire picture using same in-loop filter information or each block of the picture using individual in-loop filter information. Various embodiments according to the present invention to increase efficiency are disclosed, wherein various aspects of in-loop filter information are taken into consideration for efficient coding such as the property of quadtree-based partition, boundary conditions of a block, in-loop filter information sharing between luma and chroma components, indexing to a set of in-loop (Continued)

filter information, and prediction of in-loop filter information.

21 Claims, 8 Drawing Sheets

Related U.S. Application Data

(60) Provisional application No. 61/503,870, filed on Jul. 1, 2011, provisional application No. 61/498,949, filed on Jun. 20, 2011, provisional application No. 61/486,504, filed on May 16, 2011.

(51) Int. Cl.
| | |
|---|---|
| *H04N 19/186* | (2014.01) |
| *H04N 19/176* | (2014.01) |
| *H04N 19/463* | (2014.01) |
| *H04N 19/96* | (2014.01) |
| *H04N 19/132* | (2014.01) |
| *H04N 19/117* | (2014.01) |
| *H04N 19/196* | (2014.01) |
| *H04N 19/70* | (2014.01) |

(52) U.S. Cl.
CPC ......... *H04N 19/157* (2014.11); *H04N 19/176* (2014.11); *H04N 19/186* (2014.11); *H04N 19/196* (2014.11); *H04N 19/463* (2014.11); *H04N 19/70* (2014.11); *H04N 19/96* (2014.11)

(58) Field of Classification Search
CPC .. H04N 19/186; H04N 19/196; H04N 19/463; H04N 19/70; H04N 19/96
USPC .................................................. 375/240.02
See application file for complete search history.

(56) References Cited

U.S. PATENT DOCUMENTS

| | | | |
|---|---|---|---|
| 2004/0234144 A1* | 11/2004 | Sugimoto | H04N 19/176 382/239 |
| 2006/0227883 A1 | 10/2006 | Citro et al. | |
| 2009/0052529 A1* | 2/2009 | Kim | H04N 19/507 375/240.12 |
| 2010/0067579 A1* | 3/2010 | Bandoh | H04N 19/172 375/240.16 |
| 2010/0135387 A1 | 6/2010 | Divorra Escoda et al. | |
| 2011/0026600 A1 | 2/2011 | Kenji | |
| 2011/0243249 A1 | 10/2011 | Lee et al. | |
| 2013/0022117 A1 | 1/2013 | Lou et al. | |
| 2013/0034159 A1 | 2/2013 | Siekmann et al. | |
| 2015/0181211 A1 | 6/2015 | He | |

FOREIGN PATENT DOCUMENTS

| | | |
|---|---|---|
| EP | 1 944 974 | 7/2008 |
| EP | 2 725 797 A1 | 4/2014 |
| EP | 2 882 190 A1 | 6/2015 |

OTHER PUBLICATIONS

International Search Report dated May 24, 2012, issued in application No. PCT/CN2012/071147.

Written Opinion of International Search Report dated May 24, 2012, issued in application No. PCT/CN2012/071147.

Notification of transmittal of International Search Report and Written Opinion of International Search Report dated May 24, 2012, issued in application No. PCT/CN2012/071147.

Budagavi, M.; "Chroma ALF with reduced vertical filter size;" Joint Collaborative Team on Video Coding (JCT-VC) of ITU-T SG16 WP3 and ISO/IEC JTC1/SC29/WG11 5th Meeting: Geneva, CH, Mar. 16-23, 2011, Document JCTVC-E287.

McCann, K., et al.; "Samsung's Response to the Call for Proposals on Video Compression Technology;" document JCTVC-A124; Joint Collaborative Team on Video Coding; Apr. 2010; pp. 24.

Fu, C.M., et al.; "CE13 Sample Adaptive Offset with LCU-Independent Decoding;" Joint Collaborative Team on Video Coding (JCT-VC) of ITU-T SG16 WP3 and ISO/IEC JTC1/SC29/WG11; Mar. 2011; pp. 1-9.

Huang, Y.W., et al.; "A Technical Description of Media Tek's Proposal to the JCT-VC CfP;" Joint Collaborative Team on Video Coding (JCT-VC) of ITU-T SG16 WP3 and ISO/IEC JTC1/SC29/WG11; Apr. 2010; pp. 1-41.

Huang, Y.W., et al.; "In-Loop Adaptive Restoration;" Joint Collaborative Team on Video Coding (JCT-VC) of ITU-T SG16 WP3 and ISO/IEC JTC1/SC29/WG11; Jul. 2010; pp. 1-11.

* cited by examiner

| P4 | P8 | P12 |
| P3 | P7 | P11 |
| P2 | P6 | P10 |
| P1 | P5 | P9 |

| seq_parameter_set_rbsp( ) { | C | Descriptor |
|---|---|---|
| ... | | |
| sao_used_flag | 1 | u(1) |
| ... | | |
| } | | |

*Fig. 7*

| sao_param( ) { | C | Descriptor |
|---|---|---|
| sao_flag | 2 | u(1)\|ae(v) |
| if( sao_flag ) { | | |
|   sao_split_param( 0, 0, 0, 0 ) | | |
|   sao_offset_param( 0, 0, 0, 0 ) | | |
| sao_flag_cb | 2 | u(1)\|ae(v) |
| if( sao_flag_cb ) { | | |
|   sao_split_param( 0, 0, 0, 1 ) | | |
|   sao_offset_param( 0, 0, 0, 1 ) | | |
|   } | | |
| sao_flag_cr | 2 | u(1)\|ae(v) |
| if( sao_flag_cr ) { | | |
|   sao_split_param( 0, 0, 0, 2 ) | | |
|   sao_offset_param( 0, 0, 0, 2 ) | | |
|   } | | |
|   } | | |
| } | | |

*Fig. 8*

| sao_split_param( rx, ry, Depth, component ) { | C | Descriptor |
|---|---|---|
|   if( Depth < SaoMaxDepth) { | | |
|     sao_split_flag [ component ] [ Depth ][ ry ][ rx ] | 2 | u(1)\|ae(v) |
|   } else { | | |
|     sao_split_flag [ component ] [ Depth ][ ry ][ rx ] = 0 | | |
|   } | | |
|   if(sao_split_flag [ component ] [ Depth ][ ry ][ rx ] ) { | | |
|     sao_split_param(2*rx + 0, 2*ry + 0, Depth + 1, component ) | | |
|     sao_split_param(2*rx + 1, 2*ry + 0, Depth + 1, component ) | | |
|     sao_split_param(2*rx + 0, 2*ry + 1, Depth + 1, component ) | | |
|     sao_split_param(2*rx + 1, 2*ry + 1, Depth + 1, component ) | | |
|   } | | |
| } | | |

*Fig. 9*

| sao_offset_param ( rx, ry, Depth, component ) { | C | Descriptor |
|---|---|---|
|   if( sao_split_flag[component][Depth][ry][rx] ) { | | |
|     sao_offset_param (2*rx + 0, 2*ry + 0, Depth + 1, component ) | | |
|     sao_offset_param (2*rx + 1, 2*ry + 0, Depth + 1, component ) | | |
|     sao_offset_param (2*rx + 0, 2*ry + 1, Depth + 1, component ) | | |
|     sao_offset_param (2*rx + 1, 2*ry + 1, Depth + 1, component ) | | |
|   } else { | | |
|     sao_type_idx [ component ] [ Depth ][ ry ][ rx ] | 2 | ue(v)\|ae(v) |
|     if( sao_type_idx != 0 ) { | | |
|       for( i = 0; i < SaoOffsetNum[ sao_type_idx ]; i++ ) | | |
|         sao_offset [ component ] [ Depth ][ ry ][ rx ][ i ] | 2 | se(v)\|ae(v) |
|     } | | |
|   } | | |
| } | | |

*Fig. 10*

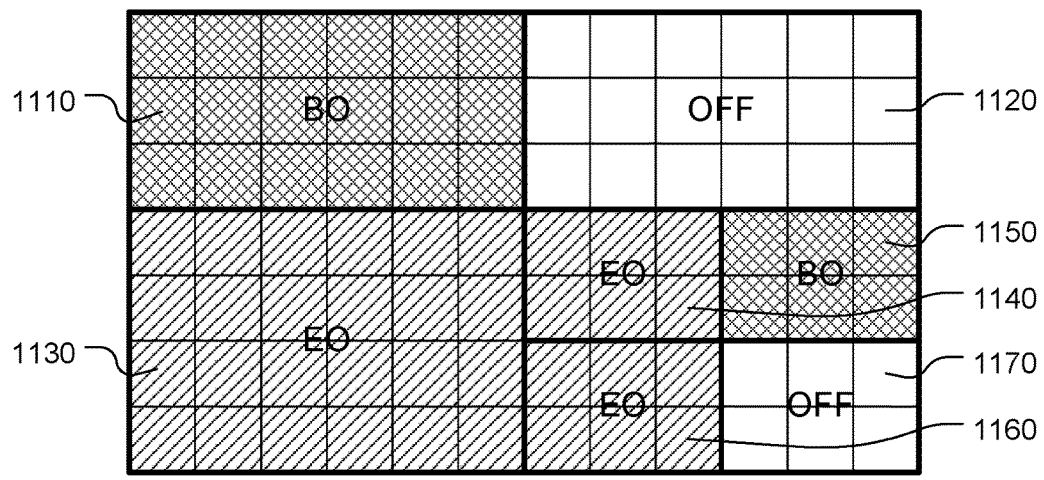
*Fig. 11*
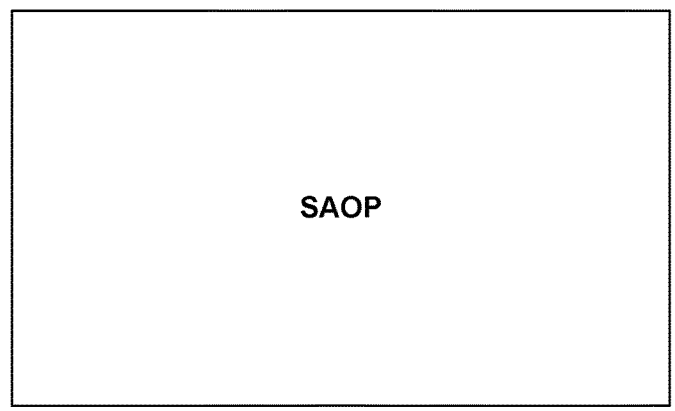
*Fig. 12A*
*Fig. 12B*

*Fig. 13*

| SAOP1 | SAOP2 | SAOP3 | SAOP4 | SAOP5 |
|---|---|---|---|---|
| SAOP6 | SAOP7 | SAOP8 | SAOP9 | SAOP10 |
| SAOP11 | SAOP12 | SAOP13 | SAOP14 | SAOP15 |

*Fig. 14*

| SAOP1 run = 2 no merge-above | SAOP1 | SAOP1 | SAOP2 run = 1 no merge-above | SAOP2 run = 0 |
|---|---|---|---|---|
| SAOP3 run = 2 merge-above=0 | SAOP3 | SAOP3 | SAOP2 run = 1 merge-above=1 | SAOP2 run = 0 |
| SAOP4 run = 4 merge-above=0 | SAOP4 | SAOP4 | SAOP4 | SAOP4 |

| SAOP1 run = 2 no merge-above | SAOP1 | SAOP1 | SAOP2 run = 1 no merge-above | SAOP2 run = 0 |
|---|---|---|---|---|
| SAOP3 d_run=0 merge-above=0 | SAOP3 | SAOP3 | SAOP2 d_run=0 merge-above=1 | SAOP2 run = 0 |
| SAOP4 d_run=2 merge-above=0 | SAOP4 | SAOP4 | SAOP4 | SAOP4 |

APPARATUS AND METHOD OF SAMPLE ADAPTIVE OFFSET FOR LUMA AND CHROMA COMPONENTS

CROSS REFERENCE TO RELATED APPLICATIONS

This application is a divisional application of co-pending U.S. patent application Ser. No. 13/311,953, filed Dec. 6, 2011, entitled "Apparatus and Method of Sample Adaptive Offset for Luma and Chroma Components", which claims priority to U.S. Provisional Patent Application No. 61/486,504, filed May 16, 2011, entitled "Sample Adaptive Offset for Luma and Chroma Components", U.S. Provisional Patent Application No. 61/498,949, filed Jun. 20, 2011, entitled "LCU-based Syntax for Sample Adaptive Offset", and U.S. Provisional Patent Application No. 61/503,870, filed Jul. 1, 2011, entitled "LCU-based Syntax for Sample Adaptive Offset". The present invention is also related to U.S. Non-Provisional patent application Ser. No. 13/158,427, entitled "Apparatus and Method of Sample Adaptive Offset for Video Coding", filed on Jun. 12, 2011. The U.S. Provisional Patent Applications and U.S. Non-Provisional Patent Application are hereby incorporated by reference in their entireties.

FIELD OF THE INVENTION

The present invention relates to video processing. In particular, the present invention relates to apparatus and method for adaptive in-loop filtering including sample adaptive offset compensation and adaptive loop filter.

BACKGROUND

In a video coding system, the video data are subject to various processing such as prediction, transform, quantization, deblocking, and adaptive loop filtering. Along the processing path in the video coding system, certain characteristics of the processed video data may be altered from the original video data due to the operations applied to video data. For example, the mean value of the processed video may be shifted. Intensity shift may cause visual impairment or artifacts, which is especially more noticeable when the intensity shift varies from frame to frame. Therefore, the pixel intensity shift has to be carefully compensated or restored to reduce the artifacts. Some intensity offset schemes have been used in the field. For example, an intensity offset scheme, termed as sample adaptive offset (SAO), classifies each pixel in the processed video data into one of multiple categories according to a context selected. The conventional SAO scheme is only applied to the luma component. It is desirable to extend SAO processing to the chroma components as well. The SAO scheme usually requires incorporating SAO information in the video bitstream, such as partition information to divide a picture or slice into blocks and the SAO offset values for each block so that a decoder can operate properly. The SAO information may take up a noticeable portion of the bitrate of compressed video and it is desirable to develop efficient coding to incorporate the SAO information. Besides SAO, adaptive loop filter (ALF) is another type of in-loop filter often applied to the reconstructed video to improve video quality. Similarly, it is desirable to apply ALF to the chroma component as well to improve video quality. Again, ALF information such as partition information and filter parameters has to be incorporated in the video bitstream so that a decoder can operate properly. Therefore, it is also desirable to develop efficient coding to incorporate the ALF information in the video bitstream.

BRIEF SUMMARY OF THE INVENTION

A method and apparatus for processing reconstructed video using in-loop filter in a video decoder are disclosed. The method and apparatus incorporating an embodiment according to the present invention comprises deriving reconstructed video data from a video bitstream, wherein the reconstructed video data comprises luma component and chroma components; receiving chroma in-loop filter indication from the video bitstream if luma in-loop filter indication in the video bitstream indicates that in-loop filter processing is applied to the luma component; determining chroma in-loop filter information if the chroma in-loop filter indication indicates that the in-loop filter processing is applied to the chroma components; and applying the in-loop filter processing to the chroma components according to the chroma in-loop filter information if the chroma in-loop filter indication indicates that the in-loop filter processing is applied to the chroma components. The chroma components may use a single chroma in-loop filter flag or each of the chroma components may use its own chroma in-loop filter flag to control whether the in-loop filter processing is applied. An entire picture may share the in-loop filter information. Alternatively, the picture may be divided into blocks and each block uses its own in-loop filter information. When in-loop filter processing is applied to blocks, the in-loop filter information for a current block may be derived from neighboring blocks in order to increase coding efficiency. Various embodiments according to the present invention to increase coding efficiency are disclosed, wherein various aspects of in-loop filter information are taken into consideration for efficient coding such as the property of quadtree-based partition, boundary conditions of a block, in-loop filter information sharing between luma and chroma components, indexing to a set of in-loop filter information, and prediction of in-loop filter information. One embodiment, among others, is a method for processing reconstructed video using in-loop filter in a video decoder, wherein a picture area of the reconstructed video is partitioned into blocks and the in-loop filter is applied to the blocks. The method comprises deriving reconstructed video data comprising reconstructed block; determining if a current reconstructed block is a new partition based on a merge flag; receiving in-loop filter information responsive to the current reconstructed block being a new partition; deriving the in-loop filter information from a target block responsive to the current reconstructed block not being said new partition, wherein the current reconstructed block is merged with the target block selected from two candidate blocks corresponding to two neighboring blocks of the current reconstructed block, and the target block is selected from said two neighboring blocks according to a second flag; and applying in-loop filter processing to the current reconstructed block using the in-loop filter information.

Another embodiment is a method for processing reconstructed video using Sample Adaptive Offset in a video encoder. The method comprises deriving reconstructed video data comprising luma component and chroma components; incorporating chroma Sample Adaptive Offset indication in a video bitstream if luma Sample Adaptive Offset indication indicates that Sample Adaptive Offset processing is applied to the luma component; incorporating chroma Sample Adaptive Offset information in the video bitstream if the chroma Sample Adaptive Offset indication indicates that the Sample Adaptive Offset processing is applied to the chroma components; and applying the Sample Adaptive Offset processing to the chroma components according to the chroma Sample Adaptive Offset information if the chroma Sample Adaptive Offset indication indicates that the Sample Adaptive Offset processing is applied to the chroma components, wherein the chroma Sample Adaptive Offset information is shared between the chroma components.

Another embodiment is a method for processing reconstructed video using Sample Adaptive Offset in a video decoder. The method comprises deriving reconstructed video data from a video bitstream, wherein the reconstructed video data comprises luma component and chroma components; receiving chroma Sample Adaptive Offset indication from the video bitstream if luma Sample Adaptive Offset indication in the video bitstream indicates that Sample Adaptive Offset processing is applied to the luma component; determining chroma Sample Adaptive Offset information if the chroma Sample Adaptive Offset indication indicates that the Sample Adaptive Offset processing is applied to the chroma components; and applying the Sample Adaptive Offset processing to the chroma components according to the chroma Sample Adaptive Offset information if the chroma Sample Adaptive Offset indication indicates that the Sample Adaptive Offset processing is applied to the chroma components.

BRIEF DESCRIPTION OF THE DRAWINGS

FIG. 3 illustrates an example of sample adaptive offset (SAO) coding for current block C using information from neighboring blocks A, D, B and E.

FIG. 4A illustrates an example of quadtree-based picture partition for sample adaptive offset (SAO) processing.

FIG. 4B illustrates an example of LCU-based picture partition for sample adaptive offset (SAO) processing.

FIG. 5A illustrates an example of allowable quadtree partition for block C, where blocks A and D are in the same partition and block B is in a different partition.

FIG. 5B illustrates another example of allowable quadtree partition for block C, where blocks A and D are in the same partition and block B is in a different partition.

FIG. 5C illustrates an example of unallowable quadtree partition for block C, where blocks A and D are in the same partition and block B is in a different partition.

FIG. 6A illustrates an example of allowable quadtree partition for block C, where blocks B and D are in the same partition and block A is in a different partition.

FIG. 6B illustrates another example of allowable quadtree partition for block C, where blocks B and D are in the same partition and block A is in a different partition.

FIG. 6C illustrates an example of unallowable quadtree partition for block C, where blocks B and D are in the same partition and block A is in a different partition.

FIG. 7 illustrates an exemplary syntax design to incorporate a flag in SPS to indicate whether SAO is enable or disabled for the sequence.

FIG. 8 illustrates an exemplary syntax design for sao_param( ), where separate SAO information is allowed for the chroma components.

FIG. 9 illustrates an exemplary syntax design for sao_split_param( ), where syntax sao_split_param( ) includes "component" parameter and "component" indicates either the luma component or one of the chroma components.

FIG. 10 illustrates an exemplary syntax design for sao_offset_param( ), where syntax sao_offset_param( ) includes "component" as a parameter and "component" indicates either the luma component or one of the chroma components.

FIG. 11 illustrates an example of quadtree-based picture partition for sample adaptive offset (SAO) type determination.

FIG. 12A illustrates an example of picture-based sample adaptive offset (SAO), where the entire picture uses same SAO parameters.

FIG. 12B illustrates an example of LCU-based sample adaptive offset (SAO), where each LCU uses its own SAO parameters.

FIG. 13 illustrates an example of using a run equal to two for SAO information sharing of the first three LCUs.

FIG. 14 illustrates an example of using run signals and merge-above flags to encode SAO information sharing.

FIG. 15 illustrates an example of using run signals, run prediction and merge-above flags to encode SAO information sharing.

DETAILED DESCRIPTION OF THE INVENTION

In High Efficiency Video Coding (HEVC), a technique named Adaptive Offset (AO) is introduced to compensate the offset of reconstructed video and AO is applied inside the reconstruction loop. A method and system for offset compensation is disclosed in U.S. Non-Provisional patent application Ser. No. 13/158,427, entitled "Apparatus and Method of Sample Adaptive Offset for Video Coding". The method and system classify each pixel into a category and apply intensity shift compensation or restoration to processed video data based on the category of each pixel. Besides adaptive offset, Adaptive Loop Filter (ALF) has also been introduced in HEVC to improve video quality. ALF applies spatial filter to reconstructed video inside the reconstruction loop. Both AO and ALF are considered as a type of in-loop filter in this disclosure.

Figure 1:
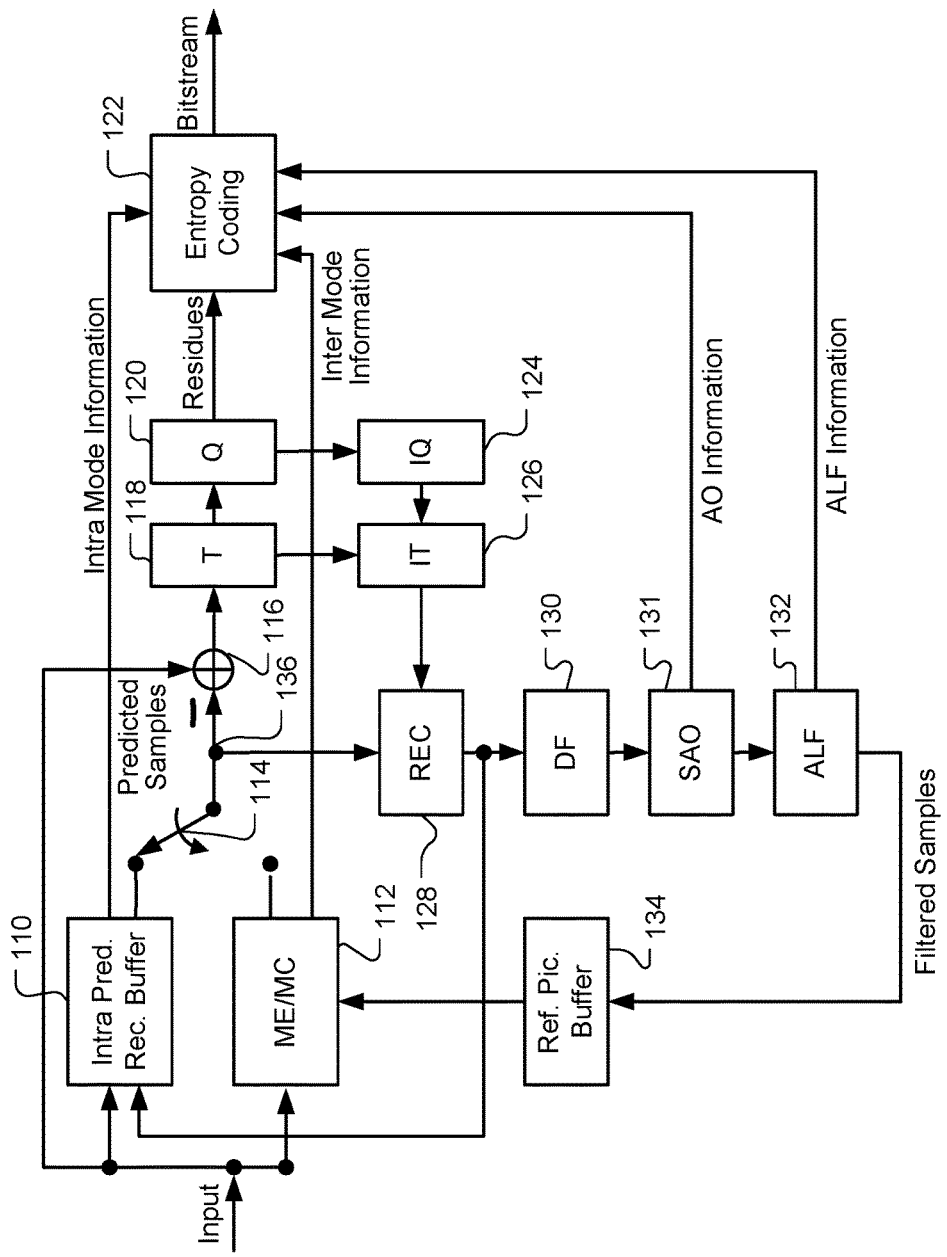
FIG. 1 illustrates a system block diagram of an exemplary video encoder incorporating a reconstruction loop, where the in-loop filter processing includes deblocking filter (DF), sample adaptive offset (SAO) and adaptive loop filter (ALF).

The exemplary encoder shown in FIG. 1 represents a system using intra/inter-prediction. Intra-prediction 110 is responsible to provide prediction data based on video data in the same picture. For inter-prediction, motion estimation (ME) and motion compensation (MC) 112 is used to provide prediction data based on video data from other picture or pictures. Switch 114 selects intra-prediction or inter-prediction data and the selected prediction data are supplied to adder 116 to form prediction errors, also called residues. The prediction error is then processed by transformation (T) 118 followed by quantization (Q) 120. The transformed and quantized residues are then coded by entropy coding 122 to form a bitstream corresponding to the compressed video data. The bitstream associated with the transform coefficients is then packed with side information such as motion, mode, and other information associated with the image area. The side information may also be subject to entropy coding to reduce required bandwidth. Accordingly the data associated with the side information are provided to entropy coding 122 as shown in FIG. 1. When an inter-prediction mode is used, a reference picture or reference pictures have to be reconstructed at the encoder end. Consequently, the transformed and quantized residues are processed by inverse quantization (IQ) 124 and inverse transformation (IT) 126 to recover the residues. The residues are then added back to prediction data 136 at reconstruction (REC) 128 to reconstruct video data. The reconstructed video data may be stored in reference picture buffer 134 and used for prediction of other frames. As it is shown in FIG. 1, incoming video data undergo a series of processing in the encoding system. The reconstructed video data from REC 128 may be subject to intensity shift and other noises due to the series of processing. Accordingly, deblocking filter 130, sample adaptive offset (SAO) 131 and adaptive loop filter (ALF) 132 are applied to the reconstructed video data before the reconstructed video data are stored in the reference picture buffer 134 in order to improve video quality. The adaptive offset information and adaptive loop filter information may have to be transmitted in the bitstream so that a decoder can properly recover the required information in order to apply the adaptive offset and adaptive loop filter. Therefore, adaptive offset information from AO 131 and adaptive loop filter information from ALF 132 are provided to entropy coding 122 for incorporation into the bitstream. The encoder may need to access to the original video data in order to derive AO information and ALF information. The paths from the input to AO 131 and ALF 132 are not explicitly shown in FIG. 1.

Figure 2:
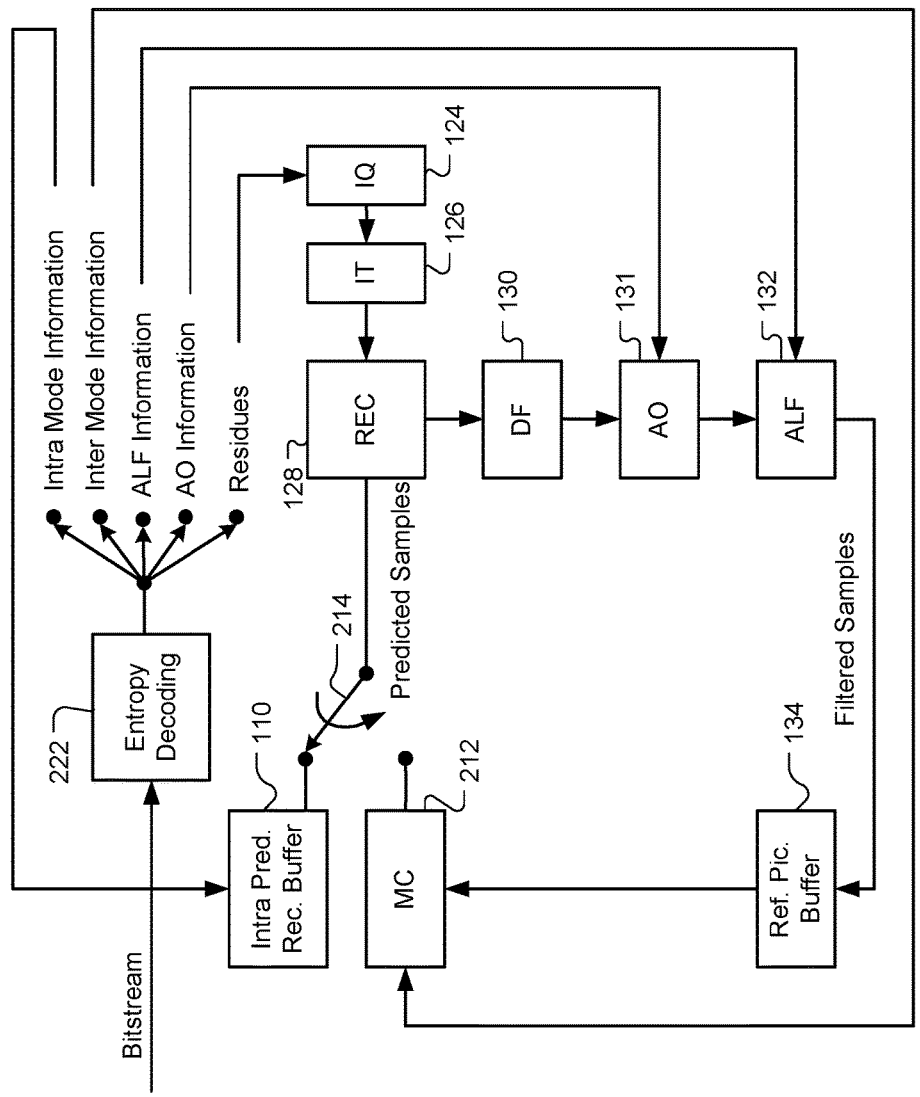
FIG. 2 illustrates a system block diagram of an exemplary video decoder incorporating a reconstruction loop, where the in-loop filter processing includes deblocking filter (DF), sample adaptive offset (SAO) and adaptive loop filter (ALF).

FIG. 2 illustrates a system block diagram of an exemplary video decoder including deblocking filter and adaptive loop filter. Since the encoder also contains a local decoder for reconstructing the video data, some decoder components are already used in the encoder except for the entropy decoder 222. Furthermore, only motion compensation 212 is required for the decoder side. The switch 214 selects intra-prediction or inter-prediction and the selected prediction data are supplied to reconstruction (REC) 128 to be combined with recovered residues. Besides performing entropy decoding on compressed video data, entropy decoding 222 is also responsible for entropy decoding of side information and provides the side information to respective blocks. For example, intra mode information is provided to intra-prediction 110, inter mode information is provided to motion compensation 212, adaptive offset information is provided to SAO 131, adaptive loop filter information is provided to ALF 132 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to intensity shift. The reconstructed video data are further processed by deblocking filter 130, sample adaptive offset 131 and adaptive loop filter 132.

The in-loop filtering is only applied to the luma component of reconstructed video according to the current HEVC standard. It is beneficial to apply in-loop filtering to chroma components of reconstructed video as well. The information associated with in-loop filtering for the chroma components may be sizeable. However, a chroma component typically results in much smaller compressed data than the luma component. Therefore, it is desirable to develop a method and apparatus for applying in-loop filtering to the chroma components efficiently. Accordingly, an efficient method and apparatus of SAO for chroma component are disclosed.

In one example incorporating an embodiment of the present invention, an indication is provided for signaling whether in-loop filtering is turned ON or not for chroma components when SAO for the luma component is turned ON. If SAO for the luma component is not turned ON, the SAO for the chroma components is also not turned ON. Therefore, there is no need to provide the indication for signaling whether in-loop filtering is turned ON or not for the chroma components in this case. A example of pseudo codes for the embodiment mentioned above is shown below:

```
If SAO for luma is turned ON;
    A first flag is signaled to indicate whether SAO for Cb is
    turned ON or not;
    A second flag is signaled to indicate whether SAO for Cr is
    turned ON or not.
Else;
    Neither the first flag nor the second flag is signaled.
```

The flag to indicate if SAO for chroma is turned ON is called chroma in-loop filter indication since it can be used for SAO as well as ALF. SAO is one example of in-loop filter processing, where the in-loop filter processing may be ALF. In another example incorporating an embodiment of the present invention, individual indications are provided for signaling whether in-loop filtering is turned ON or not for chroma components Cb and Cr when SAO for the luma component is turned ON. If SAO for the luma component is not turned ON, the SAO for the two chroma components is also not turned ON. Therefore, there is no need to provide the individual indications for signaling whether in-loop filtering is turned ON or not for the two chroma components in this case. A example of pseudo codes for the embodiment mentioned above is shown below:

```
If SAO for luma is turned ON;
    A flag is signaled to indicate whether SAO for chroma is
    turned ON or not.
Else;
    The flag is signaled.
```

Figures 3, 4A, 4B:
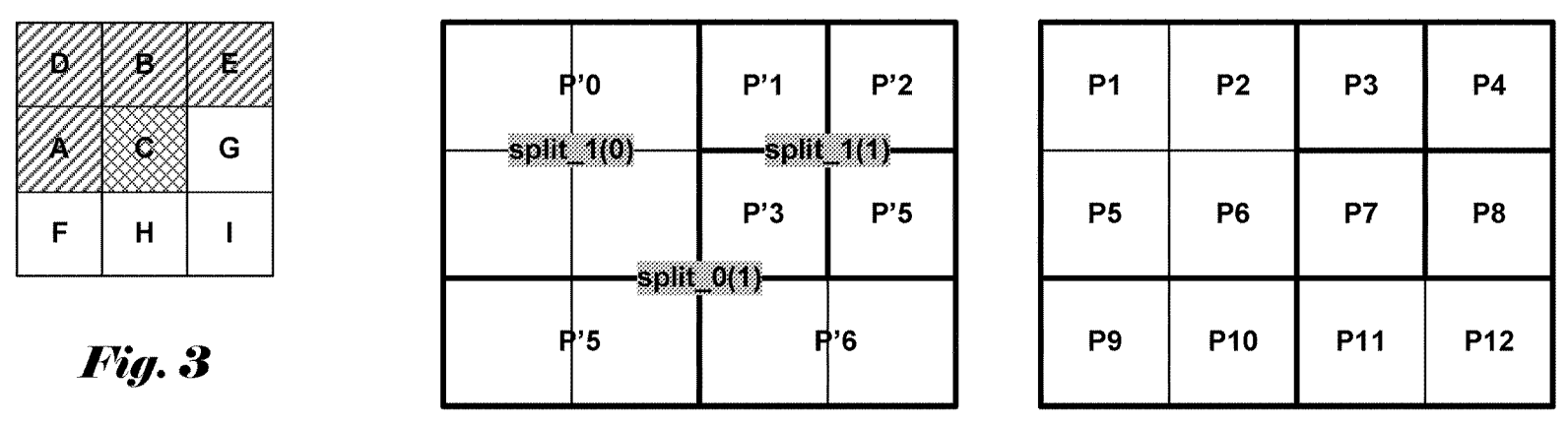

As mentioned before, it is desirable to develop efficient in-loop filtering method. For example, it is desired to reduce information required to provide indication regarding whether SAO is turned ON and SAO parameters if SAO is turned ON. Since neighboring blocks often have similar characteristics, neighboring blocks may be useful in reducing requiring SAO information. FIG. 3 illustrates an example of utilizing neighboring block to reduce SAO information. Block C is the current block being processed by SAO. Blocks B, D, E and A are previously processed neighboring blocks around C, as shown in FIG. 3. The block-based syntax represents the parameters of current processing block. A block can be a coding unit (CU), a largest coding unit (LCU), or multiple LCUs. A flag can be used to indicate that the current block shares the SAO parameters with neighboring blocks to reduce the rate. If the processing order of blocks is raster scan, the parameters of blocks D, B, E, and A are available when the parameters of block C are encoded. When the block parameters are available from neighboring blocks, these block parameters can be used to encode the current block. The amount of data required to send the flag to indicate SAO parameter sharing is usually much less than that for SAO parameters. Therefore, efficient SAO is achieved. While SAO is used as an example of in-loop filter to illustrate parameter sharing based on neighboring blocks, the technique can also be applied to other in-loop filter such as ALF.

In the current HEVC standard, the quadtree-based algorithm can be used to adaptively divide a picture region into four sub-regions to achieve better performance. In order to maintain the coding gain of SAO, the encoding algorithm for the quadtree-based SAO partition has to be efficiently designed. The SAO parameters (SAOP) include SAO type index and offset values of the selected type. An exemplary quadtree-based SAO partition is shown in FIGS. 4A and 4B. FIG. 4A represents a picture being partitioned using quadtree partition, where each small square corresponds to an LCU. The first partition (depth 0 partition) is indicated by split_0( ). A value 0 implies no split and a value 1 indicates a split applied. The picture consists of twelve LCUs as labeled by P1, P2, . . . , P12 in FIG. 4B. The depth-0 quadtree partition, split_0(1) splits the picture into four regions: upper left, upper right, lower left and lower right regions. Since the lower left and lower right regions have only one row of blocks, no further quadtree partition is applied. Therefore, depth-1 quadtree partition is only considered for the upper left and upper right regions. The example in FIG. 4A shows that the upper left region is not split as indicated by split_1(0) and the upper right region is further split into four regions as indicated by split_1(1). Accordingly, the quadtree partition results in seven partitions labeled as P'0, . . . , P'6 in FIG. 4A, where:

SAOP of P1 is the same as SAOP for P2, P5, and P6;
SAOP of P9 is the same as SAOP for P10; and
SAOP of P11 is the same as SAOP for P12.

According to the partition information of SAO, each LCU can be a new partition or merged with other LCUs. If the current LCU is merged, several merge candidates can be selected. To illustrate an exemplary syntax design to allow information sharing, only two merge candidates are allowed for quad-tree partitioning of FIG. 3. While two candidates are illustrated in the example, more candidates from the neighboring blocks may be used to practice the present invention. The syntax design is illustrated as follows:

---
If block C is not the first block of the picture,
    Use one flag to indicate block C is a new partition.
Else,
    Block C is inferred as a new partition.
If block C is a new partition,
    Encode SAO parameters.
Otherwise,
    If a left neighbor and a top neighbor exist,
        Send a mergeLeftFlag.
        If mergeLeftFlag is true, then block C is merged with block A.
        Otherwise, block C is merged with block B.
    Else,
        If a left neighbor exists, then block C is merged with block A.
        Otherwise, block C is merged with block B.
---

In another embodiment according to the present invention, the relation with neighboring blocks (LCUs) and the properties of quadtree partition are used to reduce the amount of data required to transmit SAO related information. Furthermore, the boundary condition of a picture region such as a slice may introduce some redundancy in dependency among neighboring blocks and the boundary condition can be used to reduce the amount of data required to transmit SAO related information. The relation among neighboring blocks may also introduce redundancy in dependency among neighboring blocks and the relation among neighboring blocks may be used to reduce the amount of data required to transmit SAO related information.

Figures 5A, 5B, 5C, 6A, 6B, 6C:
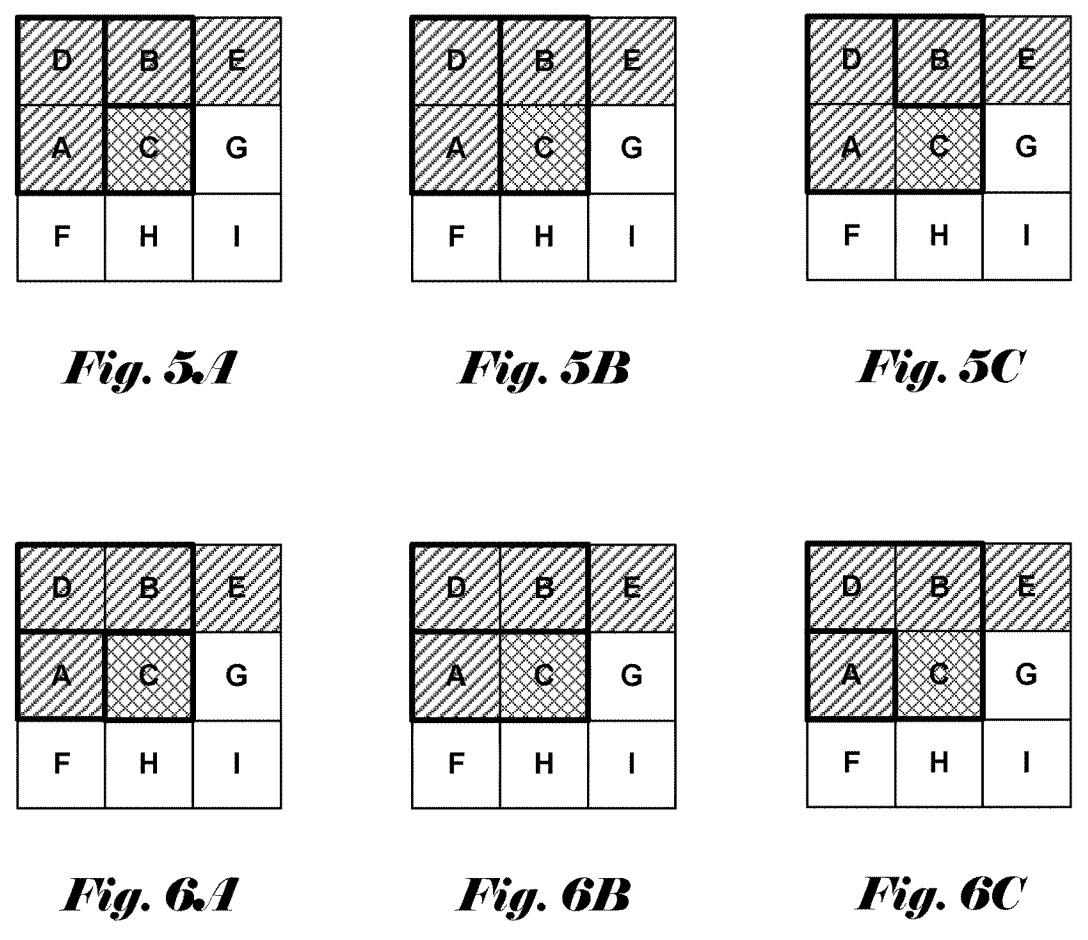

An example of redundancy in dependency among neighboring blocks is illustrated in FIGS. 5A-C. According to the property of quadtree partition, if blocks D and A are in the same partition and block B is in another partition, blocks A and C will be in different partitions as shown in FIG. 5A and FIG. 5B. On the other hand, the case shown in FIG. 5C is not allowed in quadtree partition. Therefore, the merge-candidate in FIG. 5C is redundant and there is no need to assign a code to represent the merge flag corresponding to FIG. 5C. Exemplary pseudo codes to implement the merge algorithm are shown as follows:

---
If blocks A and D are in the same partition and blocks B and D are in different partitions,
    Send newPartitionFlag to indicate that block C is a new partition.
    If newPartitionFlag is true,
        Block C is a new partition as shown in Fig.5A.
    Otherwise,
        Block C is merged with block B without signaling as shown in Fig.5B
---

As shown in the above example, there are only two allowed cases, i.e. block C is a new partition or block C is merged with block B. Therefore, a single bit for newPartitionFlag is adequate to identify the two cases. In another example, blocks D and B are in the same partition and block A is in another partition, blocks B and C will be in different partitions as shown in FIG. 6A and FIG. 6B. On the other hand, the case shown in FIG. 6C is not allowed according to quadtree partition. Therefore, the merge-candidate associated with the case in FIG. 6C is redundant and there is no need to assign a code to represent the merge flag corresponding to FIG. 6C. Exemplary pseudo codes to implement the merge algorithm are shown as follows:

---
If blocks B and D are in the same partition and blocks A and D are in different partitions,
    Send newPartitionFlag to indicate that block C is a new partition.
    If newPartitionFlag is true,
        Block C is a new partition as shown in Fig.6A.
    Otherwise,
        Block C is merged with block A without signaling as shown in Fig. 6B.
---

FIGS. 5A-C and FIG. 6A-C illustrate two examples of utilizing redundancy in dependency among neighboring blocks to further reduce transmitted data associated with SAO information for the current block. There are many other conditions that the system can take advantage of the redundancy in dependency among neighboring blocks. For example, if blocks A, B and D are in the same partition, then block C cannot be in another partition. Therefore, block C must be in the same partition as A, B, and D and there is no need to transmit an indication of SAO information sharing. The LCU block in the slice boundary can be taken into consideration to reduce the transmitted data associated with SAO information for the current block. For example, if block A does not exist, only one direction can be merged. If block B does not exist, only one direction can be merged as well. If both blocks A and B do not exist, there is no need to transmit a flag to indicate block C as a new partition. To further reduce the number of transmitted syntax elements, a flag can be used to indicate that current slice uses only one SAO type without any LCU-based signaling. When the slice is a single partition, the number of transmitted syntax elements can also be reduced. While LCU is used as a unit of block in the above examples, other block configurations (such as block size and shape) may also be used. While slice is mentioned here as an example of picture area that the blocks are grouped to share common information, other picture areas such as group of slices and a picture may also be used.

In addition, chroma and luma components may share the same SAO information for color video data. The SAO information may also be shared between chroma components. For example, chroma components (Cb and Cr) may use the partition information of luma so that there is no need to signal the partition information for the chroma components. In another example, Cb and Cr may share the same SAO parameters (SAOP) and therefore only one set of SAOP needs to be transmitted for Cb and Cr to share. SAO syntax for luma can be used for chroma components where the SAO syntax may include quadtree syntax and LCU-based syntax.

The examples of utilizing redundancy in dependency among neighboring blocks as shown in FIGS. 5A-C and FIG. 6A-C to reduce transmitted data associated with SAO information can also be applied to the chroma components. The SAOP including SAO type and SAO offset values of the selected type can be coded before partitioning information, and therefore an SAO parameter set (SAOPS) can be formed. Accordingly, indexing can be used to identify SAO parameters from the SAOPS for the current block where the data transmitted for the index is typically less than the data transmitted for the SAO parameters. When partition information is encoded, the selection among SAOPS can be encoded at the same time. The number of SAOPS can be increased dynamically. For example, after a new SAOP is signaled, the number of SAOP in SAOPS will be increased by one. To represent the number of SAOPS, the number of bits can be dynamically adjusted to match the data range. For example, three bits are required to represent SAOPS having five to eight members. When a new SAOP is signaled, the number of SAOPS will grow to nine and four bits will be needed to represent the SAOPS having nine members.

If the processing of SAO refers to the data located in the other slice, SAO will avoid fetching data from any other slice by use a padding technique or change pattern to replace data from other slices. To reduce data required for SAO information, SAO parameters can be transmitted in a predicted form, such as the difference between SAO parameters for a current block and the SAO parameters for a neighboring block or neighboring blocks. Another embodiment according to the present invention is to reduce SAO parameters for chroma. For example, Edge-based Offset (EO) classification classifies each pixel into four categories for the luma component. The number of EO categories for the chroma components can be reduced to two to reduce the transmitted data associated with SAO information for the current block. The number of bands for band offset (BO) classification is usually sixteen for the luma component. In yet another example, the number of bands for band offset (BO) classification may be reduced to eight for the chroma components.

The example in FIG. 3 illustrates a case that current block C has four merge candidates, i.e., blocks A, B, D and E. The number of merge candidates can be reduced if the merge candidates are in the same partition. Accordingly, the number of bits to indicate which merge candidate is selected can be reduced or saved. If the processing of SAO refers to the data located in the other slice, SAO will avoid fetching data from any other slice and skip the current processing pixel to avoid data from other slices. In addition, a flag may be used to control whether the SAO processing avoids fetching data from any other slice. The control flag regarding whether the SAO processing avoids fetching data from any other slice can be incorporated in a sequence level or a picture level. The control flag regarding whether the SAO processing avoids fetching data from any other slice can also be shared with the non-crossing slice boundary flag of adaptive loop filter (ALF) or deblocking filter (DF). In order to further reduce the transmitted data associated with SAO information, the ON/OFF control of chroma SAO depend on luma SAO ON/OFF information. The category of chroma SAO can be a subset of luma SAO for a specific SAO type.

Exemplary syntax design incorporating various embodiments according to the present invention is illustrated below. FIG. 7 illustrates an example of incorporating sao_used_flag in the sequence level data, such as Sequence Parameter Set (SPS). When sao_used_flag has a value 0, SAO is disabled for the sequence. When sao_used_flag has a value 1, SAO is enabled for the sequence. An exemplary syntax for SAO parameters is shown in FIG. 8, where the sao_param( ) syntax can be incorporated in Adaptation Parameter Set (APS), Picture Parameter Set (PPS) or slice header. The APS is another picture-level header in addition to the PPS to accommodate parameters that are likely to change from picture to picture. If sao_ flag indicates that the SAO is enabled, the syntax will include split parameter sao_split_param(0, 0, 0, 0) and offset parameter sao_offset_param(0, 0, 0, 0) for the luma component. Furthermore, the syntax also includes SAO flag sao_flag_cb for the Cb component and SAO flag sao_flag_cr for the Cr component. If sao_flag_cb indicates that the SAO for the Cb component is enabled, the syntax will include split parameter sao_split_param(0, 0, 0, 1) and offset parameter sao_offset_param(0, 0, 0, 1) for chroma component Cb. If sao_ flag_cr indicates that the SAO for the Cr component is enabled, the syntax will include split parameter sao_split_param(0, 0, 0, 2) and offset parameter sao_offset_param(0, 0, 0, 2) for chroma component Cr. FIG. 9 illustrates an exemplary syntax for sao_split_param(rx, ry, Depth, component), where the syntax is similar to a conventional sao_split_param ( ) except that an additional parameter "component" is added, where "component" is used to indicate the luma or one of the chroma components. FIG. 10 illustrates an exemplary syntax for sao_offset_param(rx, ry, Depth, component), where the syntax is similar to a conventional sao_offset_param ( ) except that an additional parameter "component" is added. In sao_offset_param(rx, ry, Depth, component), the syntax includes sao_type_idx [component][Depth][ry][rx] if the split flag sao_split_flag[component][Depth][ry][rx] indicates the region is not further split. Syntax sao_type_idx [component][Depth][ry][rx] specification is shown in Table 1.

TABLE 1

| sao_type_idx | sample adaptive offset type to be used | Number of categories, nSaoLength [sao_type_idx] |
| --- | --- | --- |
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |

TABLE 1-continued

| sao_type_idx | sample adaptive offset type to be used | Number of categories, nSaoLength [sao_type_idx] |
|---|---|---|
| 5 | central bands band offset | 16 |
| 6 | side bands band offset | 16 |

The sample adaptive offset (SAO) adopted in HM-3.0 uses a quadtree-based syntax, which divides a picture region into four sub-regions using a split flag recursively, as shown in FIG. 11. Each leaf region has its own SAO parameters (SAOP), where the SAOP includes the information of SAO type and the offset values to be applied for the region. FIG. 11 illustrates an example where the picture is divided into seven leaf regions, 1110 through 1170, where band offset (BO) type SAO is applied to leaf regions 1110 and 1150, edge offset (EO) type SAO is applied to leaf regions 1130, 1140 and 1160, and SAO is turned off for leaf regions 1120 and 1170. In order to improve the coding gain, a syntax design incorporating an embodiment according to the present invention uses a picture-level flag to switch between picture-based SAO and block-based SAO, where the block may be an LCU or other block sizes. FIG. 12A illustrates an example of picture-based SAO and FIG. 12B illustrates a block-based SAO, where each region is one LCU and there are fifteen LCUs in the picture. In picture-based SAO, the entire picture shares one SAOP. It is also possible to use slice-based SAO so that the entire slice or multiple slices share one SAOP. In LCU-based SAO, each LCU has its own SAOP and SAOP1 through SAOP15 are used by the fifteen LCUs (LCU1 through LCU15) respectively.

In another embodiment according to the present invention, SAOP for each LCU may be shared by following LCUs. The number of consecutive subsequent LCUs sharing the same SAOP may be indicated by a run signal. FIG. 13 illustrates an example where SAOP1, SAOP2 and SAOP3 are the same. In other words, the SAOP of the first LCU is SAOP1, and SAOP1 is used for the subsequent two LCUs. In this case, a syntax "run=2" will be encoded to signal the number of consecutive subsequent LCUs sharing the same SAOP. Since the SAOP for the next two LCUs is not transmitted, the rate of encoding their SAOPs can be saved. In yet another embodiment according to the present invention, in addition to use a run signal, the LCU in a following row according to the raster scan order may share the SAOP of a current LCU. A merge-above flag may be used to indicate the case that the current LCU shares the SAOP of the LCU above if the above LCU is available. If the merge-above flag is set to "1", the current LCU will use the SAOP of the LCU above. As shown in FIG. 14, SAOP2 is shared by four LCUs, 1410 through 1440, where "run=1" and "no merge-above" are used to indicate LCUs 1410 and 1420 share SAOP2 and they do not share SAOP with LCUs above. Furthermore, "run=1" and "merge-above=1" are used to indicate LCUs 1430 and 1440 share SAOP2 and they also share SAOP with LCUs above. On the other hand, both SAOP1 and SAOP3 are shared by two subsequent LCUs and SAOP4 is shared by four subsequent LCUs. Accordingly, the run signal for SAOP1, SAOP3 and SAOP4 are 2, 2 and 4 respectively. Since none of them shares SAOP with LCUs above, the merge-above syntax has a value 0 for blocks associated SAOP1, SAOP3 and SAOP4.

In order to reduce the bitrate for the run signal, the run signal of the above LCU can be used as a predictor for the run signal of the current LCU. Instead of encoding the run signal directly, the difference of the two run signals is encoded, where the difference is denoted as d_run as shown in FIG. 15. When the above LCU is not the first LCU of an LCU group with a run value, the run prediction value can be the run of the above LCU group subtracted by the number of LCUs that are prior to the above LCU in the same LCU group. The first LCU sharing SAOP3 has a run value of 2 and the first LCU above also has a run value of 2 (sharing SAOP1). Accordingly, d_run for the LCU sharing SAOP3 has a value of 0. The first LCU sharing SAOP4 has a run value of 4 and the first LCU above also has a run value of 2 (sharing SAOP3). Accordingly, d_run for the LCU sharing SAOP4 has a value of 2. If the predictor of a run is not available, the run may be encoded by using an unsigned variable length code (U_VLC). If the predictor exists, the delta run, d_run may be encoded by using a signed variable length code (S_VLC). The U_VLC and S_VLC can be k-th order exp-Golomb coding, Golomb-Rice coding, or a binarization process of CABAC coding.

In one embodiment according to the present invention, a flag may be used to indicate that all SAOPs in the current LCU row are the same as those in the above LCU row. For example, a flag, RepeatedRow, for each LCU row can be used to indicate that all SAOPs in this LCU row are the same as those in the above LCU row. If RepeatedRow flag is equal to 1, no more information needs to be coded. For each LCU in the current LCU row, the related SAOP is copied from the LCU in the above LCU row. If RepeatedRow flag is equal to 0, the SAOPs of this LCU row are coded.

In another embodiment according to the present invention, a flag may be used to signal whether RepeatedRow flag is used or not. For example, the EnableRepeatedRow flag can be used to indicate whether RepeatedRow flag is used or not. The EnableRepeatedRow flag can be signaled at a slice or picture level. If EnableRepeatedRow is equal to 0, the RepeatedRow flag is not coded for each LCU row. If EnableRepeatedRow is equal to 1, the RepeatedRow flag is coded for each LCU row.

In yet another embodiment according to the present invention, the RepeatedRow flag at the first LCU row of a picture or a slice can be saved. For the case of a picture having only one slice, the RepeatedRow flag of the first LCU row can be saved. For the case of one picture with multiple slices, if the SAO process is slice-independent operation, the RepeatedRow flag of the first LCU row in a slice can be saved; otherwise, the RepeatedRow flag will be signaled. The method of saving RepeatedRow flag at the first LCU row of one picture or one slice can also be applied to the case where the EnableRepeatedRow flag is used.

To reduce transmitted data associated with SAOP, an embodiment according to the present invention uses a run signal to indicate that all of SAOPs in the following LCU rows are the same as those in the above LCU row. For example, for N consecutive LCU rows containing the same SAOP, the SAOP and a run signal equal to N−1 are signaled at the first LCU row of the N consecutive repeated LCU rows. The maximum and minimum runs of the repeated LCU rows in one picture or slice can be derived and signaled at slice or picture level. Based on the maximum and minimum values, the run number can be coded using a fixed-length code word. The word length of the fixed-length code can be determined according to the maximum and minimum run values and thus can be adaptively changed at slice or picture level.

In another embodiment according to the present invention, the run number in the first LCU row of a picture or a slice is coded. In the method of entropy coding of runs and delta-runs mentioned earlier for the first LCU row of one picture or one slice, if the SAOP is repeated for consecutive LCUs, a run is coded to indicate the number of LCUs sharing the SAOP. If the predictor of a run is not available, the run can be encoded by using unsigned variable length code (U_VLC) or fixed-length code word. If the fixed-length code is used, the word length can be coded adaptively based on the image width, the coded runs, or the remaining LCU, or the word length can be fixed based on the image width or be signaled to the decoder. For example, an LCU row in a picture has N LCUs and the LCU being SAO processed is the k-th LCU in the LCU row, where k=0 . . . N−1. If a run needs to be coded, the maximum number of run is N−1−k. The word length of the to-be-coded run is floor(log 2(N−1−k)+1). In another example, the maximum and minimum number of run in a slice or picture can be calculated first. Based on the maximum and minimum value, the word length of the fixed-length code can be derived and coded.

In yet another embodiment according to the present invention, the information for the number of runs and delta-runs can be incorporated at slice level. The number of runs, delta-runs or the number of LCUs, NumSaoRun, is signaled at slice level. The number of LCUs for the current coding SAOP can be specified using the NumSaoRun flag. Furthermore, the number of runs and delta-runs or the number of LCUs can be predicted using the number of LCUs in one coding picture. The prediction equation is given by:

$$NumSaoRun = sao\_num\_run\_info + NumTBsInPicture,$$

where NumTBsInPicture is the number of LCUs in one picture and sao_num_run_info is the predicted residual value. Syntax sao_num_run_info can be coded using a signed or unsigned variable-length. Syntax sao_num_run_info may also be coded using a signed or unsigned fixed-length code word.

Embodiment of in-loop filter according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for processing reconstructed video using Sample Adaptive Offset in a video encoder, the method comprising:
   deriving reconstructed video data comprising luma component and chroma components;
   incorporating chroma Sample Adaptive Offset indication in a video bitstream when luma Sample Adaptive Offset indication indicates that Sample Adaptive Offset processing is applied to the luma component;
   incorporating chroma Sample Adaptive Offset information in the video bitstream when the chroma Sample Adaptive Offset indication indicates that the Sample Adaptive Offset processing is applied to the chroma components; and
   applying the Sample Adaptive Offset processing to the chroma components according to the chroma Sample Adaptive Offset information when the chroma Sample Adaptive Offset indication indicates that the Sample Adaptive Offset processing is applied to the chroma components, wherein the chroma Sample Adaptive Offset information is shared between the chroma components,
   wherein a chroma picture area of the reconstructed video is partitioned into chroma blocks and the chroma Sample Adaptive Offset is applied to the chroma blocks;
   wherein the chroma Sample Adaptive Offset information is incorporated in the video bitstream when a current reconstructed chroma block corresponding to one of the chroma components is a new partition;
   wherein the chroma Sample Adaptive Offset information is derived from a target chroma block when the current reconstructed chroma block is not said new partition; and
   wherein the current reconstructed chroma block is merged with the target chroma block selected from one or more candidate chroma blocks corresponding to one or more neighboring chroma blocks of the current reconstructed chroma block.

2. The method of claim 1, wherein a picture area of the reconstructed video is partitioned into blocks;
   wherein luma Sample Adaptive Offset and the chroma Sample Adaptive Offset are applied to luma blocks and chroma blocks respectively; and
   wherein partition information for the chroma components are derived from the partition information for the luma component.

3. The method of claim 1, wherein a picture area of the reconstructed video is partitioned into blocks;
   wherein luma Sample Adaptive Offset and the chroma Sample Adaptive Offset are applied to luma blocks and chroma blocks using luma Sample Adaptive Offset information and the chroma Sample Adaptive Offset information respectively; and
   wherein the luma Sample Adaptive Offset information associated with each luma block or the chroma Sample Adaptive Offset information associated with each chroma block is encoded using an index pointing to a first set of luma Sample Adaptive Offset information or a second set of chroma Sample Adaptive Offset information.

4. The method of claim 1, wherein a picture area of the reconstructed video is partitioned into blocks;
   wherein luma Sample Adaptive Offset and the chroma Sample Adaptive Offset are applied to luma blocks and chroma blocks using luma Sample Adaptive Offset information and the chroma Sample Adaptive Offset information respectively; and wherein the luma Sample Adaptive Offset information or the chroma Sample Adaptive Offset information for a current block is provided using prediction based on the luma Sample Adaptive Offset information or the chroma Sample Adaptive Offset information for one or more other blocks.

5. A method for processing reconstructed video using Sample Adaptive Offset in a video decoder, the method comprising:

deriving reconstructed video data from a video bitstream, wherein the reconstructed video data comprises luma component and chroma components;

receiving chroma Sample Adaptive Offset indication from the video bitstream when luma Sample Adaptive Offset indication in the video bitstream indicates that Sample Adaptive Offset processing is applied to the luma component;

determining chroma Sample Adaptive Offset information when the chroma Sample Adaptive Offset indication indicates that the Sample Adaptive Offset processing is applied to the chroma components; and applying the Sample Adaptive Offset processing to the chroma components according to the chroma Sample Adaptive Offset information when the chroma Sample Adaptive Offset indication indicates that the Sample Adaptive Offset processing is applied to the chroma components, wherein a chroma picture area of the reconstructed video is partitioned into chroma blocks and the chroma Sample Adaptive Offset is applied to the chroma blocks;

wherein the chroma Sample Adaptive Offset information is received from the video bitstream when a current reconstructed chroma block corresponding to one of the chroma components is a new partition;

the chroma Sample Adaptive Offset information is derived from a target chroma block when the current reconstructed chroma block is not said new partition; and wherein the current reconstructed chroma block is merged with the target chroma block selected from one or more candidate chroma blocks corresponding to one or more neighboring chroma blocks of the current reconstructed chroma block.

6. The method of claim 5, wherein the chroma Sample Adaptive Offset indication uses a single chroma Sample Adaptive Offset flag for the chroma components to share.

7. The method of claim 5, wherein the chroma Sample Adaptive Offset indication uses individual chroma Sample Adaptive Offset flags for the chroma components respectively.

8. The method of claim 5, wherein the chroma Sample Adaptive Offset information is determined based on a merge flag in the video bitstream when said one or more neighboring chroma blocks contain more than one neighboring chroma block; and wherein the chroma Sample Adaptive Offset information is inferred when said one or more neighboring chroma blocks contain one neighboring chroma block.

9. The method of claim 8, wherein at least one of said one or more candidate chroma blocks is eliminated from merging with the current reconstructed chroma block according to quadtree-partition property and merge information of said one or more candidate chroma blocks.

10. The method of claim 5, wherein a picture area of the reconstructed video is partitioned into blocks; wherein luma Sample Adaptive Offset and the chroma Sample Adaptive Offset are applied to luma blocks and chroma blocks respectively; and wherein partition information for the chroma components are derived from the partition information for the luma component.

11. The method of claim 10, wherein the chroma components share the chroma Sample Adaptive Offset information.

12. The method of claim 10, wherein the picture area of the reconstructed video is partitioned into the blocks using quadtree partition; and wherein quadtree-based syntax for the chroma components is derived from the quadtree-based syntax for the luma component.

13. The method of claim 5, wherein a picture area of the reconstructed video is partitioned into blocks; wherein luma Sample Adaptive Offset and the chroma Sample Adaptive Offset are applied to luma blocks and chroma blocks using luma Sample Adaptive Offset information and the chroma Sample Adaptive Offset information respectively; and wherein the luma Sample Adaptive Offset information associated with each luma block or the chroma Sample Adaptive Offset information associated with each chroma block is encoded using an index pointing to a first set of luma Sample Adaptive Offset information or a second set of chroma Sample Adaptive Offset information.

14. The method of claim 13, wherein a first set size corresponding to a number of luma Sample Adaptive Offset information in the first set is updated when new luma Sample Adaptive Offset information is signaled or a second set size corresponding to the number of the chroma Sample Adaptive Offset information in the second set is updated when new chroma Sample Adaptive Offset information is signaled.

15. The method of claim 14, wherein a first bit length to represent the first set size or a second bit length to represent the second set size is dynamically adjusted to accommodate the first set size or the second set size.

16. The method of claim 5, wherein the Sample Adaptive Offset processing applied to the chroma components replaces exterior data from one or more other chroma picture areas with known data or current chroma picture area data or the Sample Adaptive Offset processing is skipped when the Sample Adaptive Offset processing for the current chroma picture area refers to the exterior data.

17. The method of claim 16, wherein a control flag is used to indicate whether the Sample Adaptive Offset processing replaces exterior data or whether to skip the Sample Adaptive Offset processing when the Sample Adaptive Offset processing for the current chroma picture area refers to the exterior data.

18. The method of claim 17, wherein the control flag is a sequence level flag or a picture level flag.

19. The method of claim 17, wherein the control flag is shared by multiple Sample Adaptive Offsets.

20. The method of claim 5, wherein a picture area of the reconstructed video is partitioned into blocks; wherein luma Sample Adaptive Offset and the chroma Sample Adaptive Offset are applied to luma blocks and chroma blocks using luma Sample Adaptive Offset information and the chroma Sample Adaptive Offset information respectively; and wherein the luma Sample Adaptive Offset information or the chroma Sample Adaptive Offset information for a current block is respectively predicted by the luma Sample Adaptive Offset information or the chroma Sample Adaptive Offset information for one or more other blocks.

21. The method of claim 20, wherein the luma Sample Adaptive Offset information or the chroma Sample Adaptive Offset information for the current block is respectively predicted by the luma Sample Adaptive Offset information or the chroma Sample Adaptive Offset information corresponding to one or more neighboring blocks of the current block.

* * * * *